United States Patent [19]

Han et al.

[11] Patent Number: 5,126,296

[45] Date of Patent: Jun. 30, 1992

[54] ACTIVATION OF ZEOLITES USING HYDRATE OF TRIVALENT METAL FLUORIDE

[75] Inventors: Scott Han, Lawrenceville; Clarence D. Chang, Princeton, both of N.J.

[73] Assignee: Mobil Oil Corporation, Fairfax, Va.

[21] Appl. No.: 614,345

[22] Filed: Nov. 16, 1990

[51] Int. Cl.⁵ .................. B01J 37/00; B01J 29/06
[52] U.S. Cl. ............................. 502/61; 502/85
[58] Field of Search ........................... 502/61, 85

[56] References Cited

U.S. PATENT DOCUMENTS

| | | | |
|---|---|---|---|
| 3,354,078 | 11/1967 | Miale et al. | 208/120 |
| 3,644,220 | 2/1972 | Kearby | 252/442 |
| 4,414,189 | 11/1983 | Kokotailo et al. | 502/85 |
| 4,427,787 | 1/1984 | Miale et al. | 502/71 |
| 4,427,788 | 1/1984 | Miale et al. | 502/71 |
| 4,444,902 | 4/1984 | Chang et al. | 502/86 |
| 4,477,582 | 10/1984 | Miale | 502/26 |
| 4,559,131 | 12/1985 | Miale | 208/111 |
| 4,567,310 | 1/1986 | Rodewald | 502/61 |
| 4,576,805 | 3/1986 | Chang et al. | 423/277 |

OTHER PUBLICATIONS

Brauer, G. (Ed.), Handbook of Preparative Inorganic Chemistry, vol. 1, 2nd. Ed., p. 225, Academic Press, N.Y., 1963.
Chang et al., "Aluminum Insertion into High Silica Zeolite Frameworks. 1. Reaction with Aluminum Halides," J. Am. Chem. Soc., 1984, 106, 8143-81, p. 8145.
Yu. A. Buslaev, S. P. Petrosyants: The Composition of Fluorine Complexes of Aluminum and Fluosilicic Acid in Aqueous Solutions, Jul. 17, 1978.

Primary Examiner—Carl F. Dees
Attorney, Agent, or Firm—Alexander J. McKillop; Charles J. Speciale; Laurence P. Hobbes

[57] ABSTRACT

A method for enhancing the activity of a porous crystalline zeolite having a framework silica-to-alumina mole ratio of 25 or more which comprises contacting the zeolite with a solution comprising a hydrate of trivalent metal fluoride in aqueous media under conditions sufficient to cause incorporation of said metal in the framework of said zeolite.

18 Claims, No Drawings

ACTIVATION OF ZEOLITES USING HYDRATE OF TRIVALENT METAL FLUORIDE

BACKGROUND OF THE INVENTION

1. Field of the Invention

This invention relates to a method for enhancing the acid activity of a porous crystalline aluminosilicate zeolite, including high silica-containing porous crystalline zeolite materials, which comprises contacting the zeolite with a solution comprising a hydrate of trivalent metal fluoride in aqueous media under conditions sufficient to cause incorporation of the trivalent metal in the framework of the zeolite. The resulting material can be contacted with warm aqueous solution of an ammonium salt, and thereafter calcined to produce a zeolite composition exhibiting enhanced Bronsted acidity.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organosilicate essentially free of aluminum and exhibiting an x-ray diffraction pattern characteristic of ZSM-5 type aluminosilicate. U.S. Pat. Nos. 4,061 724; 4 073 865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

Methods for enhancing the catalytic activity of zeolitic materials are well known, including treatments involving fluorine. U.S. Pat. No. 4,444,902 relates to a process for enhancing acidic activity of a highly siliceous zeolite by contact with aluminum fluoride followed by ammonium exchange and calcination. U.S. Pat. No. 4,427,787 teaches zeolite activation by contacting an alumina-composited zeolite with hydrogen fluoride. Ammoniacal aluminum fluoride is taught as a reagent for zeolite activation in U.S. Pat. No. 4,427,788. U.S. Pat. No. 4,427,790 treats enhancing zeolite activity by treatment with a compound of the formula $L_{(n-m)}[MF_n]$ wherein L is an organic or inorganic ionic moiety $[MF_n]$ is a fluoroanion moiety wherein M is a Group VB, VIB, VIIB, VIII, IIIA, IVA or VB element, n is the coordination number of M, m is the valence of M and e is the charge associated with L. U.S. Pat. No. 4,444,902 discloses the use of metal salts to activate zeolites such as $Al(NO)_3$ which is followed by addition of a source of fluoride ions. U.S. Pat. Nos. 4,477,582 and 4,559,131 teach reactivation of steamed catalysts by contact with aqueous metal salt solution, e.g. halide. U.S. Pat. Nos. 3,354,078, 3,644,220 and 4,576,805 relate to treating crystalline aluminosilicates with volatile metal halides.

The novel process of this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silica-to-alumina mole ratios.

SUMMARY OF THE INVENTION

The present invention relates to a method for enhancing the activity of a porous crystalline zeolite, e.g., one having a framework silica-to-alumina mole ratio of 25 or more, which comprises contacting the zeolite with a solution comprising a hydrate of trivalent metal fluoride in aqueous media under conditions sufficient to cause incorporation of said metal in the framework of said zeolite. The resulting zeolite material exhibits enhanced Bronsted acidity and, therefore, improved acid activity toward catalysis of numerous chemical reactions, such as, for example, cracking of organic, e.g. hydrocarbon, compounds.

DESCRIPTION OF SPECIFIC EMBODIMENTS

The novel process of this invention is concerned with the treatment of crystalline zeolites, including high silica-containing crystalline material. The expression "high silica-containing crystalline material" is intended to define a crystalline structure which has a silica-to-alumina ratio greater than 25, preferably greater than 70, 100 or 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc. Thus, the starting materials utilized in the novel process of this invention may have a silica-to-alumina ratio greater than about 100 (irrespective of what other materials or metals are present in the crystal structure).

The zeolite starting materials utilized herein, including those having a silica-to-alumina mole ratio greater than about 100, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+ \, X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

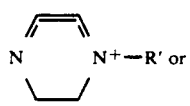

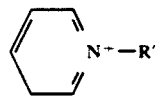

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)[n]M^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$[(CH_3)_3As^+(CH_2)_6N^+(CH_3)_3](Cl^-)_2$.

$[(C_3H_7)_3N^+(CH_2)_{10}N^+(C_3H_7)_3](Cl^-)_2$.

$[(C_6H_5)_3N^+(C_2H_4)_{16}P^+(C_6H_5)_3](OH^-)_2$.

$[(C_{18}H_{37})_3P^+(C_2H_2)_3P^+(CH_3)_3](Cl^-)_2$.

$[(C_2H_5)_3N^+(C_6H_4)N^+(C_2H_5)_3](Br^-)_2$.

$[(CH_3)_3Sb^+(CH_2)_{10}Sb^+(CH_3)_3](Cl^-)_2$.

$[(C_6H_5)_3Sb^+(CH_2)_4N^+(CH_3)_3](OH^-)_2$.

$[(CH_3)_3Bi^+(CH_2)_{18}N^+(CH_3)_3](Br^-)_2$.

$[(C_2H_3)_3N^+(CH_2)_{50}N^+(C_2H_3)_3](OH^-)_2$.

$[(C_6H_5)_3P^+(C_2H_2)_6As^+(CH_3)_3](Cl^-)_2$.

$[(CH_3)_3N^+(CH_2)_6N^+(CH_3)_3](Cl^-)_2$, and

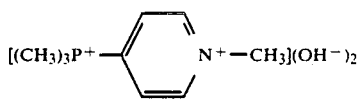

The process is carried out by contacting a crystalline zeolite preferably having a framework silica-to-alumina mole ratio of 25 or more with a solution comprising a hydrate of trivalent metal fluoride in aqueous media under conditions sufficient to cause incorporation of said metal in the framework of said zeolite. In a particularly preferred embodiment of the present invention, the zeolite is ammonium-exchanged both prior to and after contacting with the hydrate trivalent metal fluoride solution.

The contacting can be conducted at a temperature of from about 0° C. to about 100° C., preferably from about 50 to 90° C. The zeolite is contacted with an aqueous solution containing 0.01 to 10 moles, preferably 0.05 to 0.15 mole, say about 0.1 mole, of the hydrate of trivalent metal fluoride per liter of solution. The contacting step is carried out for a time sufficient to enable the incorporation of the trivalent metal in the zeolitic framework, e.g., 0.1 to 1000 hours, preferably 1 to 48 hours, say about 24 hours. The pH of the solution is maintained at 2 to 12, preferably 3 to 11, say 4 to 7.

The amount of hydrate in the solution will be from about 0.01 to 10 weight percent of the whole solution, with the amount of trivalent metal halide per gram of crystalline zeolite being treated during the impregnation step being from about 0.1 to about 1 gram/gram.

The product resulting from contact with the hydrate solution can be washed with a suitable medium, e.g., distilled water and thereafter contacted with an ammonium-containing solution e.g., a 0.1 to 2 Normal ammonium salt solution, e.g. 1N $NH_4NO_3$. Subsequent calcining at a temperature of from about 200° C. to about 600° C. in an inert atomosphere of air, nitrogen, etc. at subatmospheric, atmospheric or superatmospheric pressures for from about 1 minute to about 48 hours results in a product exhibiting the desirable Bronsted acidity.

The solution of hydrate of trivalent metal fluoride is preferably an aqueous solution prepared by the addition of the hydrate to water. The hydrate can be represented by the formula $MF_3 \cdot nH_2O$ where n=1 to 10 inclusive preferably 3, and M is a trivalent metal, preferably one selected from the group consisting of Al, Ga, and In, with aluminum being especially preferred. Particularly preferred hydrates are represented by the formula $AlF_3 \cdot 3H_2O$ and $GaF_3 \cdot 3H_2O$ Such hydrates of trivalent metal fluorides, owing to their solubility in water, provide a source of trivalent metal for incorporation in the zeolitic framework under relatively mild conditions which insures the preservation of zeolite crystallinity.

In the present invention, trivalent metal, e.g., aluminum is provided by the hydrate of the trivalent metal fluoride in an aqueous solution serving as a vehicle transporting trivalent metal, e.g., aluminum into the zeolite channels where new acid sites are formed. Therefore, supported or unsupported zeolites, including those which have undergone severe thermal or hydrothermal deformation, may be suitably activated by the present method.

Of the high silica zeolite materials advantageously treated in accordance herewith, zeolites ZSM-5, ZSM-11, ZSM-12, ZSM-23, ZSM-35, ZSM-38, ZSM-48, and zeolite beta are particularly noted. ZSM-5 is described in U.S. Pat. No. 3,702,886 and U.S. Pat. No. Re 29,948, the entire contents of each being hereby incorporated by reference herein. ZSM-11 is described in U.S. Pat. No. 3,709,979, the teaching of which is incorporated herein by reference. ZSM-12 is described in U.S. Pat. No. 3,832,449, the contents of which are incorporated herein by reference. ZSM-23 is described in U.S. Pat. No. 4,076,842, the teaching of which is incorporated herein by reference. The contents of U.S. Pat. Nos. 4,016,245 and 4,046,859, describing ZSM-35 and ZSM-38, respectively, are incorporated herein by reference. ZSM-48 is described in U.S. Pat. No. 4,397,827, the teaching of which is incorporated herein by reference. Zeolite beta is described in U.S. Pat. No. 3,308,069, the teaching of which is incorporated herein by reference.

The activity enhanced materials prepared by the present process are useful as catalyst components for acid catalyzed organic compound conversion reactions. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 to about 20; and conversion of methanol to gasoline wherein the reaction conditions include a temperature of from about 300° C. to about 550° C., a pressure of from about 5 psia to about 500 psia, and a weight hourly space velocity of from about 0.1 to about 100.

In practicing a particularly desired chemical conversion process, it may be useful to incorporate the above-described activity enhanced material with a matrix comprising a material resistant to the temperature and other conditions employed in the process. Such matrix material is useful as a binder and imparts resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the activated zeolite content ranging from about 1 to about 99 percent by weight and more usually in the range of about 5 to about 80 percent by weight of the total dry composite.

The following examples will illustrate the novel method of the present invention. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). The Alpha Test is described in U.S. Pat. No. 3,354,078, in *The Journal of Catalysis*, 4, p. 527 (1965), in *The Journal of Catalysis*, 6, p. 278 (1966), and in *The Journal of Catalysis*, 61, p. 390 (1980), each incorporated herein by reference as to that description.

When ion-exchange capacity is examined, it is determined by titrating with a solution of sulfamic acid the gaseous ammonia evolved during the temperature programmed decomposition of the ammonium-form of the present composition. The method is described in *Thermochimica Acta*, Vol. III, pp. 113-124, 1971 by G. T. Kerr and A. W. Chester, incorporated herein by reference as to that description.

EXAMPLE 1

2 g of $NH_4ZSM$-5 having a $SiO_2/Al_2O_3$ molar ratio of 598 were combined with 75 ml of a 0.09M solution of $AlF_3.3H_2O$. The resulting mixture was digested at 85° C. for 24 hours. The resulting product was washed with distilled water, and exchanged with $NH_4NO_3$. The product was analyzed and its characteristics are disclosed in Table 1 below. The ammonium exchange capacity of the zeolite was measured thermogravimetrically with the starting zeolite in the $NH_4^+$ form. The zeolite was calcined at 538° C. for 4 hours under $N_2$ atmosphere to convert it to the $H^+$ form. Hexane cracking activities (alpha) of the $H^+$-form zeolites were measured.

TABLE 1

| ZSM-5 | Starting ZSM-5 | Treated |
|---|---|---|
| Silica/almina by analysis | 598 | 373 |
| Ammonium exchange capacity (meq/g zeolite) | 0.0426 | 0.0868 |
| Hexane cracking activity | 16 | 38 |
| Crystallinity | 100% | 100% |

The data of Table 1 clearly indicate aluminum insertion into the parent high silica zeolite using aluminum fluoride based on the increased alumina content by analysis and the increase in strong acid sites based on the higher $NH_4^+$ exchange capacity of the product. The zeolite has been activated and crystallinity is essentially preserved.

EXAMPLE 2

2 g of the above-prepared $NH_4ZSM-5$ starting material having a $SiO_2/Al_2O_3$ molar ratio of 598 are combined with 75 ml of a 0.1M solution of $GaF_3.H_2O$. The resulting mixture is digested at 85° C. for 24 hours. The resulting product is washed with distilled water, and exchanged with $NH_4NO_3$. The product is analyzed and its characteristics indicate the incorporation of gallium in the zeolite framework.

EXAMPLE 3

A sample of non-organic ZSM-5 having a $SiO_2/Al_2O_3$ molar ratio of 26 was converted to the $NH_4^+$ form by ion-exchange. To 10 g of this zeolite was added a solution containing 4 g of $GaF_3.3H_2O$ Aldrich) in 150 ml of distilled water. This mixture was shaken in a plastic bottle and allowed to digest at 85° C. in a steam chest for 18 hours. The product was filtered while hot and rinsed with 600 ml of distilled water. The solid was then stirred with 400 ml of distilled water for 48 hours, filtered, and washed with one liter of water. The product was dried at 120° C. and converted to the $NH_4^+$ form by exchange with 1 N $NH_4NO_3$. The catalyst was then calcined. The analytical data obtained for the catalyst is set out below in Table II. These data indicate removal of Al from the parent with both framework Ga replacement and addition of non-framework gallium. The $T_{max}$ obtained for the gallium sample is consistent with published data (Chu et al., *J.Phys. Chem.* 1985, 89, 1569.) for framework gallium. The % non-framework gallium was obtained by subtracting the TGA/TPAD measured gallium molar content from the overall gallium molar content by analysis.

TABLE 2

| | UNCALCINED | CALCINED |
|---|---|---|
| $NH_4^+$ Exchange Capacity (meq/g) | 1.03 | 0.89 |
| Calculated $SiO_2Al_2O_3$ | 31 | 36 |
| $T_{max}$(°C.) | 400 | 376 |
| alpha | 1050 | 410 |
| % $SiO_2$ (analysis) | 86.60 | 78.12 |
| % $Al_2O_3$ (analysis) | 4.76 | 0.29 |
| % Ga (analysis) | — | 10.39 |
| $SiO_2/Al_2O_3$ | 31 | 457 |
| $SiO_2Al_2O_3 + Ga_2O_3$ | 31 | 17 |
| % non-framework Ga | — | 4.7 |

EXAMPLE 4

The product of Example 3 was bound with 35 wt % gamma-alumina and evaluated for aromatics formation with n-hexane as the feed. At 538° C. and 0.56 LHSV, the catalyst yielded 23.19% $C_1$-$C_2$ paraffins and 59.29% aromatics with 99+% conversion. The aromatic selectivity, defined as wt % aromatics yield/(wt % $C_1+C_2+$wt % aromatics yield), was 71.88%.

What is claimed is:

1. A method for enhancing the activity of a porous crystalline zeolite having a framework silica-to-alumina mole ratio of 25 or more which comprises contacting the zeolite with a solution consisting essentially of a hydrate of trivalent metal fluoride in aqueous media under conditions sufficient to cause incorporation of said metal in the framework of said zeolite.

2. The method of claim 1 wherein said conditions include a temperature of 20° to 100° C. and a pH of 3 to 11.

3. The method of claim 2 wherein said trivalent metal is selected from the group consisting of Al, Ga, and In.

4. The method of claim 3 wherein said hydrate is a trihydrate.

5. The method of claim 1 wherein said hydrate is $AlF_3.nH_2O$, where n=1 to 10, inclusive.

6. The method of claim 1 wherein said metal is aluminum.

7. The method of claim 4 wherein said metal is aluminum.

8. The method of claim 1 wherein said hydrate is $GaF_3.nH_2O$, where n=1 to 10, inclusive.

9. The method of claim 8 where n=3.

10. The method of claim 1 wherein said mole ratio is 70 or more.

11. The method of claim 1 wherein said mole ratio is 200 or more.

12. The method of claim 7 wherein said mole ratio is 500 or more.

13. The method of claim 1 wherein said zeolite is selected from the group consisting of ZSM-5, ZSM-11, ZSM-12, ZSM-21, ZSM-22, ZSM-23, ZSM-35, ZSM-38, ZSM-48 and zeolite beta.

14. The method of claim 1 wherein said zeolite is ZSM-5.

15. The method of claim 1 wherein said zeolite is in the $NH_4^+$ exchanged form.

16. The method of claim 1 wherein said solution contains 0.01 to 10 moles of said hydrate of trivalent metal fluoride per liter of solution.

17. The method of claim 1 wherein said solution contains 0.05 to 0.15 mole of said hydrate of trivalent metal fluoride per liter of solution.

18. The method of claim 1 wherein said solution contains 0.1 mole of said hydrate of trivalent metal fluoride per liter of solution.